United States Patent Office 3,558,733
Patented Jan. 26, 1971

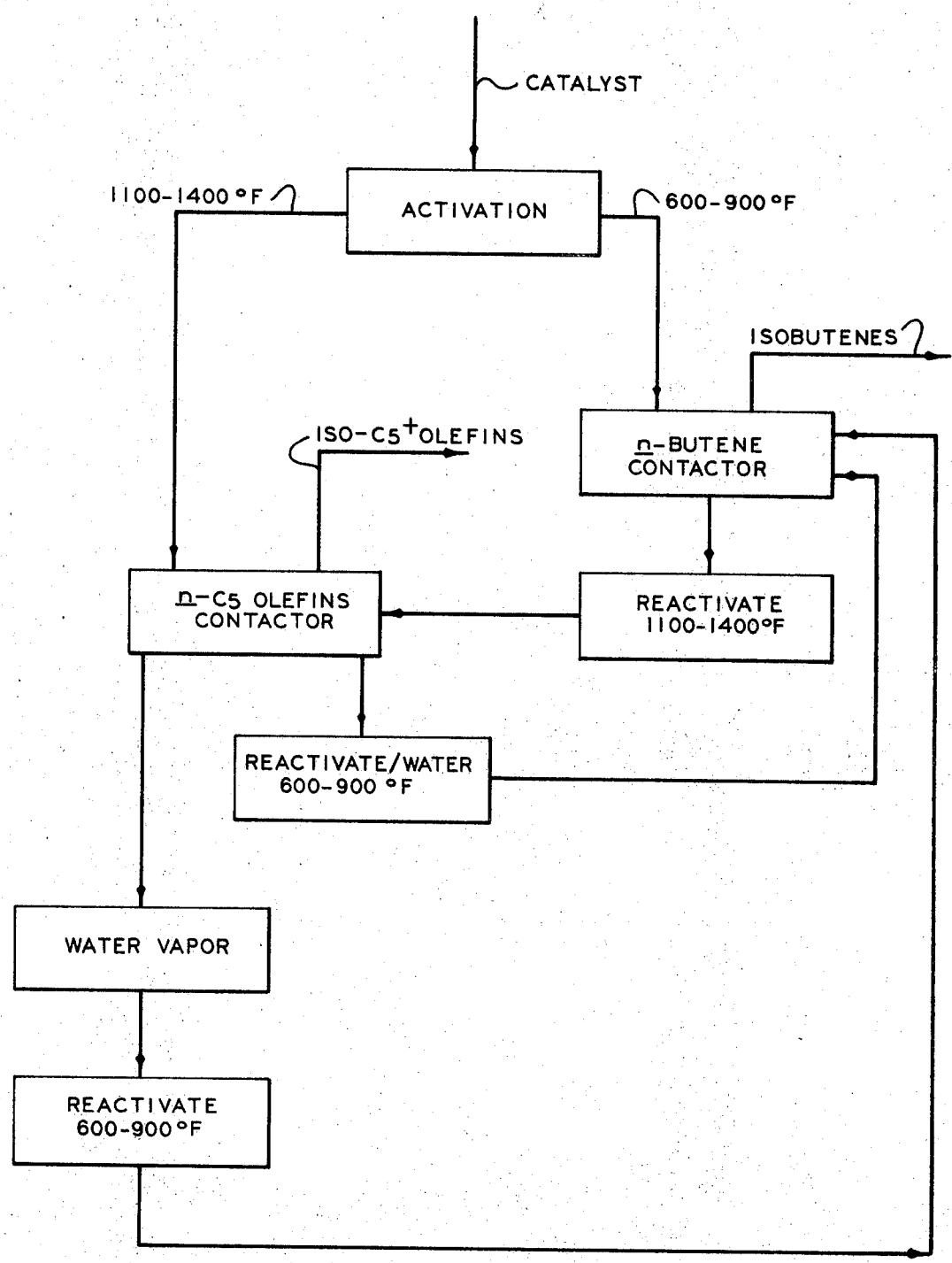

3,558,733
OLEFIN ISOMERIZATION PROCESS WITH ALUMINA OF CONTROLLED WATER CONTENT
John W. Myers, Bartlesville, Okla., assignor to Phillips Petroleum Company, a corporation of Delaware
Filed July 30, 1969, Ser. No. 845,956
Int. Cl. C07c 5/24
U.S. Cl. 260—683.2
15 Claims

ABSTRACT OF THE DISCLOSURE

Alumina catalysts are activated at 600 to 900° F. for increased skeletal isomerization of n-butenes. Further, these catalysts are used in a versatile blocked process for skeletal isomerization of both n-butenes and higher n-olefins. The catalysts can be activated at 1100 to 1400° F. for the skeletal isomerization of higher n-olefins and subsequently exposed to moisture and reactivated at 600 to 900° F. for n-butenes. Alternatively, the reaction for the n-butenes can be obtained by adding a controlled amount of water to the catalyst. Optionally, the catalyst can be first activated for n-butenes, and subsequently prepared for the higher n-olefins by reactivating at 1000 to 1400° F.

This invention relates to the conversion of unbranched olefins to corresponding relatively highly branched olefins having the same number of carbon atoms per molecule. It also relates to a method of activating alumina catalysts for the skeletal isomerization of n-butanes. In another aspect it relates to a process for successive activation and reactivation of alumina catalysts for successive skeletal isomerization of n-butenes and for higher n-olefins by appropriate steps of heating and moisture addition.

In skeletal isomerization, the n-olefins are skeletally isomerized to branched olefins, i.e., to isoolefins. The process is accomplished by contacting n-olefin feedstock with alumina catalysts under skeletal isomerization conditions which generally include relatively high temperatures and relatively low pressures, and optionally include the presence of a diluent gas.

The diluent gas, if used, can include such as nitrogen, hydrogen, carbon dioxide and the like. Such a diluent gas tends to improve selectivity by suppressing side reactions such as polymerizations. In some instances the presence of hydrogen, in particular, increases the length of the on-stream time within an operation-regeneration cycle.

I have discovered that as to the n-butenes, the skeletal isomerization rate over alumina catalysts decreases progressively as the catalyst activation drying temperature increases over the range 700 to 1200° F. This is surprising and contrary to known prior data relative to such closely realted olefins as the n-pentenes; or to cyclohexene, for example, where the isomerization rate increases with the activation temperature, to which the alumina catalyst has been exposed, up to a maximum in the area of about 1100 to 1300° F.

Further, I have also discovered that the adding back of small amounts of moisture to a dehydrated alumina catalyst is not simply equivalent to leaving the same amount of water within such a catalyst. But, rather, that the catalyst with added back water is different, in that its skeletal isomerization activity is greatly enhanced as to the n-butenes.

Further, based on my findings that the isomerization rate for the n-butenes decreases with increasing activation temperature, and that the response is enhanced by added back water, I have worked out a very useful and effective blocked skeletal isomerization process for the n-butenes and for the higher $C_5^+$ n-olefins.

Therefore, it is an object of my invention to provide improved catalysts for the skeletal isomerization of the n-olefins. It is a further object to provide an improved process for the skeletal isomerization of the n-butenes. It is a still further object to provide a versatile blocked process of skeletal isomerization for both n-butenes and for the higher n-olefins over alumina catalysts.

Other aspects, objects and the several advantages of my invention will be apparent to one skilled in the art from the following description and from the appended claims.

I have discovered several things about the n-butenes in contact with alumina catalysts. In studying the skeletal isomerization of n-butenes over alumina catalysts where drying or activation temperature is increased from 700 to 1200° F. with correspondingly decreasing water contents, I find that the skeletal isomerization rate for the n-butenes decreases with this increasing activation temperature.

Further, two alumina catalysts, apparently identical in every respect including the moisture content, are radically different in activity. An alumina catalyst previously dried by higher temperature calcination and whose moisture had been added back in a rehydration step shows significantly increased skeletal isomerization activity versus a similar catalyst whose water has simply been left in situ by lower temperature calcination.

Additionally, I find, in using hydrogen as a diluent, that the hydrogenation rate for the n-butenes in contact with these alumina catalysts first decreases appreciably over a temperature activation range of 700 to 800° F., and then increases gradually from 800° up to 1200° F. Discovery of these facts permits me to effectively prepare alumina catalysts to obtain maximum skeletal isomerization with minimum loss by hydrogenation.

Since, as to the n-pentenes and higher n-olefins the skeletal isomerization rate increases in respect to increasing alumina catalyst activation temperatures up to a maximum in the area of about 1100 to 1400° F., I am able to provide a very versatile and effective process of successive activation of the catalyst to skeletally isomerize n-butenes, then the higher n-olefins, back to the n-butenes if desired, and so on ad infinitum. With but one catalyst, and with my appropriate steps of temperature for activation or reactivation and of moisture addition or readdition, the catalyst can be readily and effectively modified for optimum isomerization of an n-butene, or of a higher n-olefin, in response to changing plant conditions and requirements or to feedstock availability.

Applicable alumina, and alumina catalysts, as I use the terms herein, include catalytic grade eta-alumina, gamma-alumina, as well as modified aluminas such as alumina-boria and the halogen-treated aluminas, particularly when only small amounts of boria or halogen are used. Eta-alumina is preferred because of its particular effectiveness.

The processes to which I refer are the skeletal isomerization of the n-olefins, or more particularly the n-butenes and the higher n-olefins of $C_5^+$ up to about 10 carbon atoms per molecule. When I refer to the higher n-olefins, I include the n-pentenes, the n-hexenes, n-octenes, and I also include such lightly branched materials as 3-methyl-pentene-1, and the like.

My discoveries relative to the n-butenes and higher n-olefins and their response to alumina catalysts activated at varying temperatures, and to the process I have worked out for successive activation and reactivation of the alumina catalysts for skeletal isomerization of n-butenes or of higher n-olefins, are shown on the attached schematic flow sheet. This flow sheet shows most graphically the high versatility of the process I have worked out because of the peculiar differences of the n-butenes versus the higher $C_5^+$ n-olefins and is particularly helpful in following the description of my invention.

Hereinafter, I describe in detail the operation of my invention (1) for most effective conversion of n-butenes, (2) for most effective conversion of $C_5^+$ olefins, and (3) for changing over from one feedstock to another. In this description, the terms activation and reactivation refer to a catalyst heat treatment primarily designed to dry the catalyst to a water content within a certain range. The term catalyst regeneration refers to a periodic catalyst treatment at elevated temperatures and in the presence of an oxygen-containing gas which is primarily designed to burn off any coke which may have accumulated on the surface of the catalyst.

CYCLE FOR SKELETAL ISOMERIZATION OF THE n-BUTENES

A fresh alumina catalyst, containing about 10 weight percent or more of moisture, is initially activated at from about 600 to 900° F., preferably at from 700 to 900° F. Such activation is generally carried out over a time of from 0.5 to 24 hours in the presence of dry flowing gases such as air, nitrogen, hydrogen, carbon dioxide, and the like. Such an activation procedure reduces the removable moisture or water content of the catalyst to a range of about 0.75 to 2.5 weight percent. A preferred water level is within about 0.90 to 1.6 weight percent.

The activated catalyst is then contacted with a feedstream containing n-butenes under skeletal isomerization conditions, which conditions include contacting temperatures of from 600 to 1100° F., preferably 800–1000° F., to form substantial amounts of isobutene. This contacting usually is continued until the activity of the catalyst declines to the minimum level desired due to coke formation. The n-butene feed is then interrupted and the catalyst or catalyst bed is then regenerated.

The catalyst regeneration is accomplished by briefly contacting the catalyst with an oxygen-containing gas such as air or, preferably, air which has been further diluted with an inert gas such as nitrogen and the like. The burning off of the catalyst coke takes place effectively at about 900 to 1200° F. After regeneration, the catalyst and reactor can be briefly flushed with any convenient inert gas to remove any residual oxygen.

Since regeneration of the catalyst requires temperatures in the range of from 900 to 1200° F. for removal of coke, the alumina undergoes some additional drying. Thus, the water content of the regenerated catalyst becomes less than optimum for conversion of n-butenes.

Therefore, to return the catalyst to optimum activity for n-butenes, the temperature of the catalyst bed is returned to the desired skeletal isomerization temperature and a controlled amount of water is added sufficient to replace the additional loss due to regeneration and to return the total water content of the catalyst to within the range of from 0.75 to 2.5, preferably 0.9 to 1.6, weight percent. The moisture readdition can be by any convenient method, such as by adding a measured amount of water or steam to an inert gas such as that used to flush the catalyst system. After the water readdition, the n-butene feed is resumed and the skeletal isomerization cycle begins again.

As an alternative procedure to restore the regenerated catalyst for efficient n-butene conversion, the regenerated catalyst bed is cooled to 700° F. or less and is then exposed to a water-containing gas to substantially increase its water content. After such a hydration step, the catalyst bed is activated at 600 to 900° F., preferably 700 to 900° F., as in the activation of a fresh catalyst discussed hereinabove. After such activation, the n-butene feed is resumed and the conversion cycle begins again.

CYCLE FOR SKELETAL ISOMERIZATION OF $C_5^+$ OLEFINS (HIGHER n-OLEFINS)

A fresh alumina catalyst is activated similarly as described hereinabove for n-butene conversion except that the activation temperature is in the range of 1100 to 1400° F. Such activation reduces the water content of the catalyst to less than about 0.75 weight percent.

The activated catalyst is then ready for use in converting $C_5^+$ olefins, such as n-pentene to isopentene, under skeletal isomerization conditions which include contacting temperatures in the range of from 400 to 1000° F., preferably 600 to 900° F.

When the catalyst activity falls off appreciably due to coke formation, the regeneration of the catalyst is carried out in the same manner as that described hereinabove for the cycle for n-butene conversion. Because the catalyst moisture content is already quite low, the regeneration does not significantly further reduce the water level. The catalyst, after regeneration, is ready to be returned to service for the further conversion of the $C_5^+$ olefins.

CHANGEOVER FROM $C_5^+$ OLEFIN FEED TO n-BUTENE FEED

After one or more cycles wherein $C_5^+$ olefins have been converted and after it is necessary to convert n-butenes, the catalyst is regenerated for coke removal as described hereinabove. The regenerated catalyst is then subjected to either of the two alternative water readdition sequences in order to reprepare the catalyst for use in its skeletal isomerization of the n-butenes. The rehydration procedures are as described hereinbefore in the description of treatment of n-butenes. The regenerated catalyst is either cooled to the operating temperature and treated with a controlled amount of water to bring the total water level of the catalyst within the range of 0.75 to 2.5 weight percent; or, alternatively, the regenerated catalyst is cooled to about 700° F. or less, treated with a moisture-containing gas, and then activated with a dry gas in the temperature range of 600 to 900° F., preferably 700 to 900° F. Following either approach, the catalyst is again highly suitable for n-butene conversion.

CHANGEOVER FROM n-BUTENE FEED TO $C_5^+$ OLEFIN FEED

After one or more cycles in n-butene conversion, the catalyst is regenerated to remove coke. The regenerated catalyst is then modified to make it efficient for $C_5^+$ olefin conversion by an activation treatment such as that described hereinabove for preparing a fresh catalyst for $C_5^+$ olefin conversion. That is, the catalyst is heated in a flowing dry gas at a temperature within the range of 1100 to 1400° F., preferably 1100 to 1300° F. After such activation, the catalyst is ready to be used for $C_5^+$ olefin skeletal isomerization.

Because the typical temperatures encountered during the coke burn-off in the catalyst regeneration step are sometimes quite high and frequently within the 1100 to 1400° F. range for maximum $C_5^+$ olefin skeletal isomerization activity, the separate activation step can sometimes be omitted if desired. That is, the newly regenerated catalyst can be flushed briefly if desired and put immediately on stream for $C_5^+$ olefin conversion.

Such cycles and changeovers can be continued indefinitely as desired or in accordance with availability of feedstocks at the refinery or processing plant. Such versatility provides considerable economies in catalyst usage, equipment requirements. Of course, it should be realized that these catalysts can be activated, rehydrated, reactivated at any time a change in feedstock is desired by treating as I have described, without waiting for coke formation. For this reason, my flow sheet shows the essentials of my invention without obscuring my invention with additional factors.

EXAMPLE I

The following table shows the results of skeletal isomerization of butene-2 by contacting the butene-2 feedstream with alumina catalyst which had been activated at various drying temperatures. The contact was carried out in a vertical quartz fixed catalyst fed reactor at a butene flow rate of about 0.0033 gram-mole/hour-gram catalyst, at atmospheric pressure, at 700° F., and at 10 moles of hydrogen per mole of butene-2.

TABLE I.—n-BUTENE SKETAL ISOMERIZATION

Effect of Drying Temperature of Alumina Catalyst [a]

| | Drying Temperature, ° F.[b] | | | | | |
|---|---|---|---|---|---|---|
| | 700 | 800 | 900 | 1,000 | 1,100 | 1,200 |
| Water content, weight percent [c] | 1.80 | 1.47 | 1.15 | 0.87 | 0.63 | 0.45 |
| Surface area, square meters/gram | 215 | 214 | 220 | 209 | 208 | 188 |
| Skeletal isomerization rate [d] ×10⁴ [e] | 5.89 | 5.40 | 4.90 | 3.63 | 2.69 | 2.21 |
| Reactor effluent composition, weight percent: | | | | | | |
| $C_2$'s+$C_3$'s | 0.5 | 0.5 | 0.7 | 2.2 | 5.5 | 11.2 |
| Isobutane | 0.7 | 0.9 | 1.4 | 1.8 | 2.2 | 2.7 |
| n-Butane | 11.0 | 8.1 | 9.2 | 11.7 | 19.3 | 26.6 |
| Isobutene | 16.5 | 15.5 | 13.7 | 9.5 | 6.0 | 4.1 |
| n-Butene | 70.1 | 72.9 | 72.8 | 69.2 | 54.3 | 41.1 |
| $C_5^+$ | 1.2 | 2.1 | 2.2 | 5.6 | 12.7 | 14.3 |
| Total | 100.0 | 100.0 | 100.0 | 100.0 | 100.0 | 100.0 |

[a] Catalyst was 20 to 30 mesh granules of eta-alumina from the Davison Chemical Co.
[b] Drying carried out for 16 hours in flow of dry hydrogen.
[c] Determined by weight loss after calcination for 4 hours at 2,192° F.
[d] Gram-moles/hour-gram catalyst.
[e] Includes isobutane as well as isobutene.

The above Table I shows the decreasing water or moisture content of the catalyst in accordance with the increasing drying temperature across the range of 700 to 1200° F. Table I also clearly shows that the skeletal isomerization response of the n-butene decreases across the same temperature range. This is in direct contrast to the typical response of $C_5^+$ olefins as will be exemplified by the response of n-pentenes below.

Thus, by careful selection of the initial activation temperature of the alumina catalyst, where n-butenes are to be skeletally isomerized, it is possible to select an area where the skeletal isomerization rate is very good. This desired initial activation range for the alumina catalyst is from about 600 to about 900° F. These effects are shown clearly in the product composition portions of Table I. Loss to the saturated butane at 1000° and above is undesirably high. Substantial loss to products of $C_5$ and above begins at about 1000° F. Also losses to lower carbon products, $C_2$'s and $C_3$'s, begins appreciably at 1000° F.

EXAMPLE II

The following Table II shows the response of n-pentenes toward contact with alumina catalysts at temperatures of 700° F., and 1105° F. The water contents of such catalysts are dependent on the drying temperature and thus correspond approximately to the appropriate temperature columns of Table I preceding. As Table II shows, the yield of skeletally isomerized $C_5$ products increases substantially at the higer activation temperature.

TABLE II.—n-PENTENES SKELETAL ISOMERIZATION

Effect of Activation Temperature

| | Drying temperature, ° F. | |
|---|---|---|
| | 700 | 1,105 |
| Approximate water content, weight percent | 1.8 | 0.6 |
| Test conditions: | | |
| Temperature, ° F | 702 | 709 |
| LHSV | 1.1 | 1.0 |
| Pressure, atm | 1 | 1 |
| H₂/pentene, mol ratio | 10 | 11 |
| Conversion [a], percent | 37.6 | 60.8 |
| Yield of isopentenes, percent | 36.3 | 54.2 |
| Selectivity [a] to isopentenes, percent | 96.5 | 89.1 |

[a] Conversion refers to the percentage conversion of the n-olefin to compounds other than the n-olefin starting material. Selectivity refers to the per pass yield of the isoolefin divided by the per pass conversion.

EXAMPLE III

As I have stated hereinbefore, water added back, under certain conditions, enhances the effectiveness of the alumina catalysts for skeletal isomerization of the n-butenes. Even though the total water content of a catalyst first activated is the same as one which has been dried at a high temperature and water added back, the latter catalyst produces an enhanced result. These properties of the catalysts are shown in Table III following.

Eta-alumina containing initially about 10 weight percent water was used to prepare a catalyst for the skeletal isomerization of butene-2. Portions of the alumina were dried at 700, 800, 900, 980, 1100 and 1200° F. for 16 hours and then tested for conversion of butene-2 at 700° F., at atmospheric pressure, at about 0.28 LHSV, and using hydrogen for dilution to a butene mole ratio of 10.

To demonstrate an important feature of my invention, a portion of the alumina, which had been dried at 1100° F. for 16 hours to a water level of about 0.6 weight percent, was then rewetted with an amount of moisture equivalent to 0.8 weight percent of the alumina, and similarly tested for skeletal isomerization activity toward butene-2. The results were as follows:

TABLE III.—SKELETAL ISOMERIZATION OF BUTENE-2

| | Drying temperature, ° F. | | | | | | |
|---|---|---|---|---|---|---|---|
| | 700 | 800 | 900 | 980 | 1,100 | 1,100 | 1,200 |
| Approximate water content, weight percent | 1.8 | 1.5 | 1.2 | 0.9 | 0.6 | (a) | 0.4 |
| Isobutene in $C_4^-$ product, weight percent | 16.7 | 15.9 | 14.6 | 10.9 | 6.9 | 24.8 | 5.6 |

(a) Rewetted with 0.8 weight percent water.

These data clearly show the advantage of added-back water to an eta-alumina previously dried by calcination.

EXAMPLE IV

Several additional runs were made to show the effects of adding varying amounts of water to previously calcined alumina catalysts on the skeletal isomerization of n-butenes. The catalysts were then tested for skeletal isomerization activity and hydrogenation activity. The results are shown in Table IV following:

TABLE IV.—n-BUTENE SKELETAL ISOMERIZATION [a]

Effect of Adding Back Water to Alumina [b]

| H₂O added, [c] wt. percent | Total H₂O content, wt. percent | Relative activity | |
|---|---|---|---|
| | | Isomerization | Hydrogenation |
| 0.00 | 0.63 | 100 | 100 |
| 0.27 | 0.90 | 194 | 80 |
| 0.49 | 1.12 | 254 | 36 |
| 0.80 | 1.43 | 290 | 8 |
| 0.92 | 1.55 | 216 | 8 |
| 1.00 | 1.63 | 210 | 10 |

(a) Isomerization conditions and catalyst same as in Example I.
(b) Alumina activated (dried) initially at 1,100° F. to a water content of 0.63 weight percent.
(c) Pulses of water were added to hydrogen flowing over the catalyst at 700° F.

The above Table IV shows clearly that the relative activity is increased drastically, to a surprising degree, as to the skeletal isomerization of the n-butenes. On the other hand, the hydrogenation activity, a side reaction, was drastically reduced.

Thus, it can be readily seen, from the data presented relative to the n-butenes, and the generalized results relative to higher n-olefins that the process I have shown graphically on the attached flow sheet is effective practical, and unusually versatile.

The properly activated alumina catalyst can be applied to the skeletal isomerization process by any conventional manner known to the art, such as by means of a fixed bed, fluidized bed, and the like. The form of the activated catalyst can be such as 10 to 20 mesh granules, $\frac{1}{16}$-inch extrudate, microspheres, and the like as may be convenient.

The skeletal isomerization process itself usually is operated at pressures in the range of from about 0 to about 100 p.s.i.g., preferably in the range of about 0 to about 50 p.s.i.g. Such process pressure ranges minimize olefin losses through hydrogenation or polymerization, while helping to sustain the skeletal isomerization activity of the catalyst.

The temperature in the reaction zone will normally be maintained at from about 400 to about 1100° F., preferably from about 600 to 1000° F. The olefin feed to the reaction zone will have a liquid hourly spaced velocity measured at 60° F. of from about 0.01 to about 30 volumes of liquid per volume of catalyst per hour, preferably from about 1 to about 20. Hydrogen dilution of the olefin feed, when used, will be from about 0.5:1 to about 20:1 moles of hydrogen per mole of olefin, more usually 1:1 to about 10:1.

The olefin feedstream itself can be diluted with other inert diluent materials such as paraffin hydrocarbons or other hydrocarbons, as well as with diluents such as carbon dioxide, nitrogen, and the like. Technically, there is no particular maximum degree of dilution, only whatever is bounded by practicality and economic considerations.

It is at times advantageous to add a very small amount, a few parts per million, of water during the isomerization process in order to maintain the moisture content of the rehydrated activated alumina catalyst in use, particularly when isomerizing butenes. The supplementary water can be added to the reaction zone directly, or can be added with the diluent or with the olefin feed or both. The amount of moisture to be added will be in the range of from about 5 to about 100 p.p.m., most usually 20 to 100 p.p.m., parts of moisture per part of olefin feed. Such supplementary moisture can be added intermittently or continuously, and with or separate from the olefin feed.

Any form of supplementary water can be used as may be convenient and available. Liquid moisture, or gaseous such as steam, can be injected where such would reach the catalyst, intermittently or continuously, in the reaction zone. Moisture even can be introduced by an in situ formation achieved by introducing traces of oxygen or air into the system, and the water would then be formed in situ within the reaction zone by oxidation of diluent hydrogen to form water. Addition can even be made in the absence of olefin feed such as by introducing the moisture with a hydrogen carrier during an intermittent operation of the process.

While the process of my invention has been particularly described relative to the seletal isomerization of n-butenes and n-pentenes, the process of my invention is also equally applicable to the similar alternating isomerization of n-buteness and the higher n-olefins such as n-hexenes, or n-heptenes, and the like.

Reasonable variations and modifications are possible within the scope of the disclosure without departing from the scope and spirit thereof.

That which is claimed is:

1. A process for the skeletal isomerization of n-butenes which comprises:
    (a) preparing an isomerization catalyst by heating alumina to above about 1100° F.; cooling; exposing to moisture, while maintaining the said catalyst at a temperature of from about 600 to about 900° F., sufficient to adjust the moisture content to from about 0.75 to about 2.5 weight percent; and
    (b) contacting the prepared isomerization catalyst with at least one n-butene under skeletal isomerization conditions, and thereby producing substantial skeletal isomerization of the said at least one n-butene to isobutene.

2. The process of claim 1 wherein the said alumina includes eta-alumina, gamma-alumina, alumina-boria, and halogen compound-treated alumina.

3. The process of claim 1 wherein the contacting step (b) includes the further presence of from 0.1 to 100 p.p.m. moisture based on the amount of the said at least one n-butene.

4. A process for the isomerization of n-butene and higher n-olefins, said higher n-olefins having from 5 to 10 carbon atoms per molecule, which comprises:
    (a) heating alumina to from about 1100 to about 1400° F. and thereby activating the alumina as a skeletal isomerization catalyst selective toward higher n-olefins containing from 5 to about 10 carbon atoms,
    (b) contacting the activated alumina catalyst from step (a) with at least one higher n-olefin under skeletal isomerization conditions and thereby substantially skeletally isomerizing the said at least one higher n-olefin to isoolefin,
    (c) contacting the catalyst from step (b) at a temperature of from about 600 to about 900° F. with a minor amount of moisture such that the final moisture content of the catalyst is from 0.75 to 2.5 weight percent, and thereby activating the said catalyst as an isomerization catalyst selective toward n-butenes,
    (d) contacting the activated catalyst from step (c) with at least one n-butene under skeletal isomerization conditions, and therby substantially skeletally isomerizing the said n-butene to isobutene.

5. The process of claim 4 wherein the said alumina includes eta-alumina, gamma-alumina, alumina-boria, and halogen compound-treated alumina.

6. The process of claim 5 wherein the said higher n-olefin is n-pentene, and wherein in step (b) the said n-pentene is isomerized to isopentene.

7. The process of claim 4 wherein in the said step (a) said heating occurs during coke burn-off of catalyst from said step (d).

8. The process of claim 4 wherein in said step (c) the catalyst is contacted in a cooled condition with moisture and subsequently activated at from about 600 to about 900° F.

9. The process of claim 5 wherein the said isomerization conditions include a reaction zone temperature of from about 400° F. to about 1100° F., a liquid hourly space velocity of 0.01 to about 30 volumes of liquid per volume of catalyst per hour, and a pressure of from about 0 to about 100 p.s.i.g.

10. A process for the skeletal isomerization of hydrocarbons which comprises:
    (a) heating alumina to a temperature of from about 600 to about 900° F.,
    (b) contacting the heated catalyst from step (a) with a minor amount of water sufficient to adjust the moisture content thereof to about 0.75 to about 2.5 weight percent, and thereby activating the catalyst as a skeletal isomerization catalyst selective toward n-butenes,
    (c) contacting the activated catalyst from step (b) with at least one n-butene under skeletal isomerization conditions, and thereby substantially skeletally isomerizing the said n-butene to isobutene, (d) heating the catalyst from step (c) to from about 1100 to about 1400° F. and thereby activating the said catalyst as an isomerization catalyst selective toward higher n-olefins of from 5 to about 10 carbon atoms,
(e) contacting the activated catalyst from step (d) with at least one said higher n-olefin under skeletal isomerization conditions, and thereby substantially skeletally isomerizing the said at least one higher n-olefin to the corresponding isoolefin.

11. The process of claim 10 wherein step (e) is followed by:
(f) contacting the catalyst from step (e) with a minor amount of water,
(g) heating the catalyst from step (f) to a temperature of from about 600 to about 900° F., said heating adjusting the moisture content of the said catalyst to about 0.75 to about 2.5 weight percent, thereby reactivating the catalyst as a skeletal isomerization catalyst selective toward n-butenes, and
(h) repeating step (c).

12. The process of claim 11 wherein steps (f) and (g) are conducted essentially simultaneously.

13. The process of claim 11 wherein the said alumina includes eta-alumina, gamma-alumina, alumina-boria, and halogen compound-treated alumina.

14. The process of claim 13 wherein the said higher n-olefin is an n-pentene.

15. The process of claim 13 wherein the contacting step (c) further includes minor amounts of moisture.

References Cited

UNITED STATES PATENTS

| | | | |
|---|---|---|---|
| 2,395,274 | 2/1946 | Hillyer et al. | 260—683.2 |
| 2,301,342 | 11/1942 | Summerford | 260—683.2 |
| 2,388,510 | 11/1945 | Voge | 260—683.2 |
| 2,263,026 | 11/1941 | Arveson | 260—683.2 |
| 2,422,884 | 6/1947 | Burgin | 260—683.2 |

DELBERT E. GANTZ, Primary Examiner

V. O'KEEFE, Assistant Examiner